US008340943B2

(12) United States Patent
Kim et al.

(10) Patent No.: US 8,340,943 B2
(45) Date of Patent: Dec. 25, 2012

(54) METHOD AND SYSTEM FOR SEPARATING MUSICAL SOUND SOURCE

(75) Inventors: Min Je Kim, Daejeon (KR); Seungjin Choi, Gyeongsangbuk-do (KR); Jiho Yoo, Seoul (KR); Kyeongok Kang, Daejeon (KR); Inseon Jang, Daejeon (KR); Jin-Woo Hong, Daejeon (KR)

(73) Assignees: Electronics and Telecommunications Research Institute, Daejeon (KR); Postech Acadeny-Industry Foundation, Pohang-si, Kyungsangbook-Do (KR)

( * ) Notice: Subject to any disclaimer, the term of this patent is extended or adjusted under 35 U.S.C. 154(b) by 314 days.

(21) Appl. No.: 12/855,194

(22) Filed: Aug. 12, 2010

(65) Prior Publication Data

US 2011/0054848 A1 Mar. 3, 2011

(30) Foreign Application Priority Data

Aug. 28, 2009 (KR) ........................ 10-2009-0080684
Dec. 10, 2009 (KR) ........................ 10-2009-0122217

(51) Int. Cl.
*H04B 15/00* (2006.01)

(52) U.S. Cl. .......... 702/190; 702/196; 84/625; 704/200; 704/204; 704/211; 704/226; 381/98; 708/320

(58) Field of Classification Search .................. 702/190, 702/196; 84/625, 615, 617, 618, 635; 38/98; 708/320; 704/200, 204, 226, 211
See application file for complete search history.

(56) References Cited

U.S. PATENT DOCUMENTS

| | | | | |
|---|---|---|---|---|
| 7,672,834 | B2 * | 3/2010 | Smaragdis | 704/204 |
| 7,698,143 | B2 * | 4/2010 | Ramakrishnan et al. | 704/500 |
| 7,797,153 | B2 * | 9/2010 | Hiroe | 704/211 |
| 8,015,003 | B2 * | 9/2011 | Wilson et al. | 704/226 |
| 8,112,272 | B2 * | 2/2012 | Nagahama et al. | 704/226 |
| 2005/0222840 | A1 * | 10/2005 | Smaragdis | 704/204 |
| 2007/0185705 | A1 * | 8/2007 | Hiroe | 704/200 |
| 2009/0132245 | A1 * | 5/2009 | Wilson et al. | 704/226 |
| 2009/0234901 | A1 * | 9/2009 | Cichocki et al. | 708/320 |
| 2011/0058685 | A1 * | 3/2011 | Sagayama et al. | 381/98 |
| 2011/0061516 | A1 * | 3/2011 | Kim et al. | 84/625 |

* cited by examiner

*Primary Examiner* — Carol Tsai
(74) *Attorney, Agent, or Firm* — Nelson Mullins Riley & Scarborough LLP; EuiHoon Lee, Esq.

(57) ABSTRACT

Provided is an apparatus of separating a musical sound source, which may re-construct mixed signals into target sound sources and other sound sources directly using sound source information performed using a predetermined musical instrument when the sound source information is present, thereby more effectively separating sound sources included in the mixed signal. The apparatus may include a Nonnegative Matrix Partial Co-Factorization (NMPCF) analysis unit to perform an NMPCF analysis on a mixed signal and a predetermined sound source signal using a sound source separation model, and to obtain a plurality of entity matrices based on the analysis result, and a target instrument signal separating unit to separate, from the mixed signal, a target instrument signal corresponding to the predetermined sound source signal by calculating an inner product between the plurality of entity matrices.

17 Claims, 4 Drawing Sheets

METHOD AND SYSTEM FOR SEPARATING MUSICAL SOUND SOURCE

CROSS-REFERENCE TO RELATED APPLICATIONS

This application claims the benefit of Korean Patent Application No. 10-2009-0080684, filed on Aug. 28, 2009, and No. 10-2009-0122217, filed on Dec. 10, 2009, in the Korean Intellectual Property Office, the disclosures of which are incorporated herein by reference.

BACKGROUND

1. Field of the Invention

Embodiments of the present invention relate to a method of separating a musical sound source, and more particularly, to an apparatus and method of separating a musical sound source, which may re-construct mixed signals into target sound sources and other sound sources directly using sound source information performed using a predetermined musical instrument when the sound source information is present, thereby more effectively separating sound sources included in the mixed signal.

2. Description of the Related Art

Along with developments in audio technologies, a method of separating a predetermined sound source from a mixed signal where various sound sources are recorded has been developed.

However, in a conventional method of separating sound sources, the sound sources may be separated utilizing statistical characteristics of the sound sources based on a model of an environment where signals are mixed and thus, only mixed signals having a same number of sound sources to be separated as a number of sound sources in the model may be applicable.

Accordingly, there is a need for a method of separating a predetermined sound source from commercial musical signals that usually have a number of sound sources greater than that of the mixed signals when obtaining only one or two mixed signals.

SUMMARY

An aspect of the present invention provides an apparatus of separating a musical sound source, which may re-construct mixed signals into target sound sources and other sound sources directly using sound source information performed using a predetermined musical instrument when the sound source information is present, thereby more effectively separating sound sources included in the mixed signal.

According to an aspect of the present invention, there is provided an apparatus of separating musical sound sources, the apparatus including: a Nonnegative Matrix Partial Co-Factorization (NMPCF) analysis unit to perform an NMPCF analysis on a mixed signal and a predetermined sound source signal using a sound source separation model, and to obtain a plurality of entity matrices based on the analysis result; and a target instrument signal separating unit to separate, from the mixed signal, a target instrument signal corresponding to the predetermined sound source signal by calculating an inner product between the plurality of entity matrices.

In this instance, the plurality of entity matrices obtained by the NMPCF analysis unit may include a frequency domain characteristic matrix U of the predetermined sound source signal, a location and intensity matrix Z in which U is expressed in a time domain of the predetermined sound source signal, a location and intensity matrix V in which U is expressed in a time domain of the mixed signal, a frequency domain characteristic matrix W of remaining sound sources included in the mixed signal, and a location and intensity matrix Y in which W is expressed in the time domain of the mixed signal.

Also, the NMPCF analysis unit may determine the predetermined sound source signal as a product of U and Z, and determine the mixed signal as a product of ½ of U and V summed with a product of ½ a weight of W and Y to thereby obtain the plurality of entity matrices U, Z, V, W, and Y.

Also, the apparatus may further include a time-frequency domain conversion unit to receive the mixed signal and the predetermined sound source signal of a time domain, to convert the received mixed signal and predetermined sound source signal of the time domain into the mixed signal and the predetermined sound source signal of a time-frequency domain to transmit the converted signals to the NMPCF analysis unit, and to extract phase information from the received mixed signal and predetermined sound source signal of the time domain, and a time domain signal conversion unit to convert the target instrument signal into a time domain signal using the phase information, and to separate, from the mixed signal, the sounds performed using the predetermined musical instrument.

According to another aspect of the present invention, there is provided a method of separating musical sound sources, the method including: converting a mixed signal and a predetermined sound source signal of a time domain into a mixed signal and a predetermined sound source signal of a time-frequency domain; extracting phase information from the mixed signal and the predetermined sound source signal of the time domain; performing an NMPCF analysis on the mixed signal and the predetermined sound source signal of the time-frequency domain using a sound source separation model; obtaining a plurality of entity matrices based on the NMPCF analysis result; separating, from the mixed signal, a target instrument signal corresponding to the predetermined sound source signal by calculating an inner product between the plurality of entity matrices; and separating, from the mixed signal, sounds performed using a predetermined musical instrument by converting the target instrument signal into a time-domain signal using the phase information.

Additional aspects, features, and/or advantages of the invention will be set forth in part in the description which follows and, in part, will be apparent from the description, or may be learned by practice of the invention.

EFFECT

According to embodiments of the present invention, there is provided an apparatus of separating a musical sound source, which may re-construct mixed signals into target sound sources and other sound sources directly using sound source information performed using a predetermined musical instrument when the sound source information is present, thereby more effectively separating sound sources included in the mixed signal.

Also, according to embodiments of the present invention, there is provided an apparatus of separating a musical sound source which may separate a desired sound source from a single mixed signal and thus, may be applicable in separating commercial musical sounds obtaining only two mixed signals or less.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
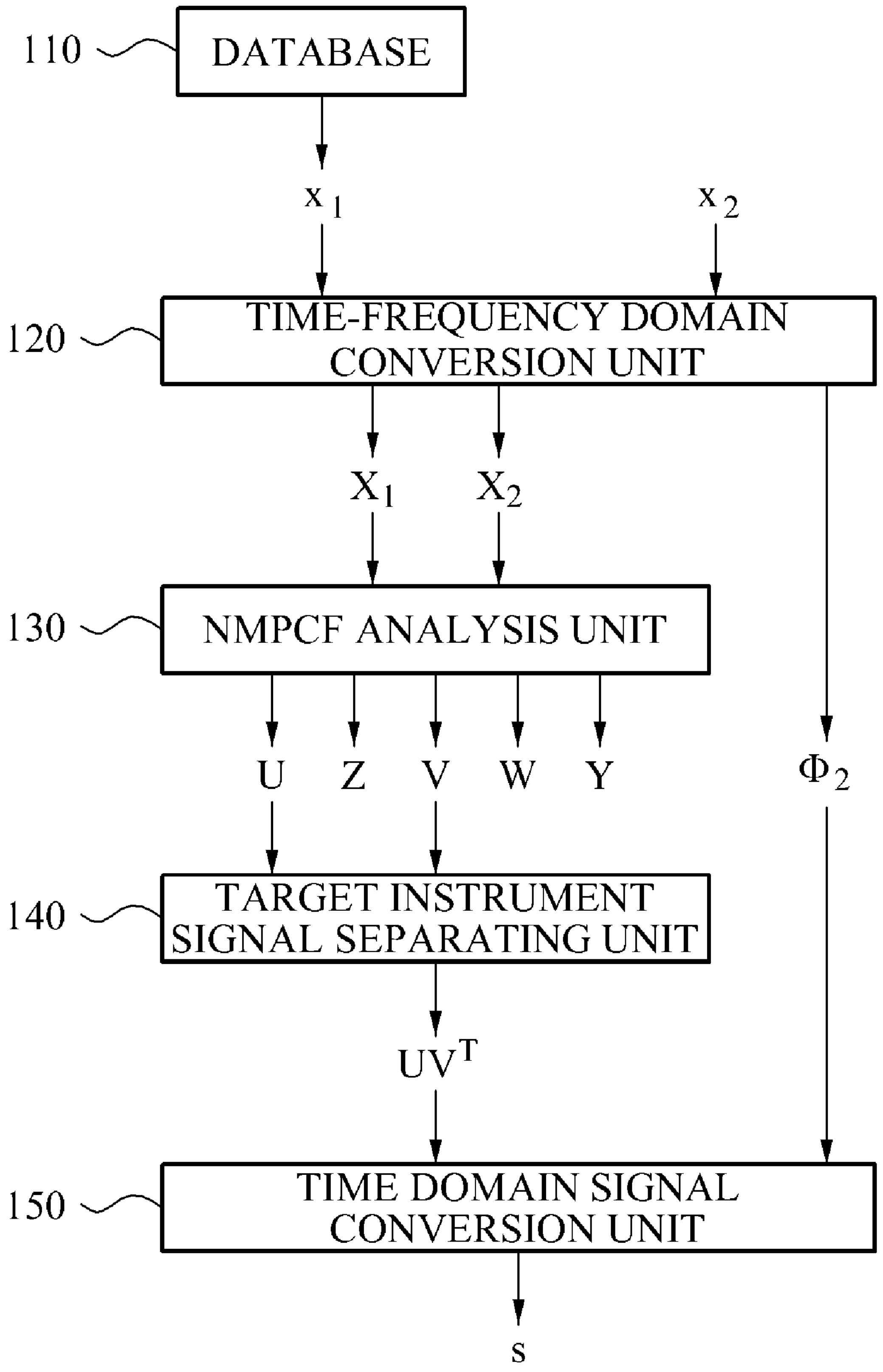
FIG. 1 illustrates an example of an apparatus of separating a musical sound source according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 illustrates an example of an apparatus of separating a musical sound source according to an embodiment of the present invention.

The apparatus includes a database 110, a time-frequency domain conversion unit 120, a Nonnegative Matrix Partial Co-Factorization (NMPCF) analysis unit 130, a target instrument signal separating unit 140, and a time domain signal conversion unit 150.

The database 110 may store information about a solo performance using a predetermined musical instrument, and transmit the information about the solo performance as a type of a predetermined sound source signal $x_1$.

In this instance, the predetermined sound source may have a significantly great amount of data to include various characteristics of the predetermined sound source. In this case, a great amount of database signals may need to be processed for each sound source separation operation.

Accordingly, as for the predetermined sound source, a scheme of more effectively compressing database signals converted into a time domain or a time-frequency domain may be used. In this instance, the compression scheme may have a condition such that characteristics required for the separation of the predetermined sound source are maintained even after performing the compression scheme, which is different from a general audio compression scheme.

The time-frequency domain conversion unit 120 may receive the predetermined sound source signal $x_1$ of the time domain transmitted from the database 110 and a mixed signal $x_2$ of the time domain inputted from a user, and convert the received sound source signal $x_1$ and mixed signal $x_2$ into a sound source signal $X_1$ and mixed signal $X_2$ of a time-frequency domain. In this instance, the mixed signal may be a musical signal where performances of various musical instruments or voices are mixed.

Also, the time-frequency domain conversion unit 120 may extract phase information $\Phi_2$ from the received predetermined sound source signal $x_1$ and mixed signal $x_2$.

In this instance, the time-frequency domain conversion unit 120 may transmit the sound source signal $X_1$ and the mixed signal $X_2$ to the NMPCF analysis unit 130, and transmit the phase information $\Phi_2$ to the time domain signal conversion unit 150.

The NMPCF analysis unit 130 may perform an NMPCF analysis on the mixed signal and the predetermined sound source signal using a sound source separation model, and obtain a plurality of entity matrices based on the analysis result.

In this instance, the NMPCF analysis unit 130 may determine, as a signal satisfying Equation 1 below, $X_{(1)}$ and $X_{(2)}$, that is, a magnitude of the sound source signal $X_1$ and the mixed signal $X_2$, and arbitrary frequency domain characteristic matrices U and W, location and intensity matrices Z, V, and Y in which U and W are expressed in a time domain may be obtained based on the following Equation 1. In this instance, $X_{(1)}$ and $X_{(2)}$ may be a matrix $X_{(1)}^{n\times m_2}$ and a matrix $X_{(2)}^{n\times m_2}$, respectively.

$$X_{(1)} = U \times Z^T \qquad \text{[Equation 1]}$$

$$X_{(2)} = \frac{1}{2} U \times V^T + \frac{\lambda}{2} W \times Y^T.$$

In this instance, U, Z, V, W, and Y may be expressed as entity matrices $U^{n\times p_2}$, $Z^{m_2\times p_2}$, $V^{m_2\times p_2}$, $W^{n\times p_2}$, and $Y^{m_2\times p_2}$, respectively, and may be non-negative real numbers. Also, U may be included in both of $X_{(1)}$ and $X_{(2)}$ and thus, may be shared.

Specifically, under an assumption that $X_{(1)}$ is obtained through a relationship between U and Z, the NMPCF analysis unit 130 may determine input signals as a product of frequency domain characteristics such as pitch, tone, and the like and time domain characteristics indicating an intensity the input signals are performed at in a predetermined time location.

Also, since a product $U\times V^T$ of entity matrices included in $X_{(2)}$ shares the frequency domain characteristic matrix U identical to that used in $X_{(1)}$, the NMPCF analysis unit 130 may determine a manner in which a frequency domain characteristic of a target sound source to be separated is included in $X_{(2)}$.

Also, the NMPCF analysis unit 130 may define entity matrices W and Y regardless of information stored in the database 110, and thereby may simultaneously perform a modeling of a state where remaining sound sources other than the target sound source comprise the mixed signal.

That is, $X_{(2)}$ may be comprised of a sum of a relationship of entity matrices expressing the target sound source signals to be separated and a relationship of entity matrices expressing remaining sound source signals.

The NMPCF analysis unit 130 may derive and use an optimized target function, as illustrated in the following Equation 2, based on Equation 1.

$$L = \frac{1}{2}\|x_{(2)} - U \times V^T - W \times Y^T\|_F + \frac{\lambda}{2}\|x_{(1)} - U \times Z^T\|_F. \qquad \text{[Equation 2]}$$

In this instance, a weight λ of Equation 2 may be a weight between a second section for restoring sounds performed using a predetermined musical instrument and a first section for the mixed signal.

Also, the NMPCF analysis unit 130 may update U, Z, V, W, and Y by applying U, Z, V, W, and Y to the following Equation 3 in accordance with an NMPCF algorithm.

$$U \leftarrow U \odot \frac{\lambda X_{(1)} Z + X_{(2)} V}{\lambda U Z^T Z + U V^T V + W Y^T V}$$ [Equation 3]

$$Z \leftarrow Z \odot \frac{X_1^T U}{Z U^T U}$$

$$V \leftarrow V \odot \frac{X_2^T U}{V U^T U \mid Y W^T U}$$

$$W \leftarrow W \odot \frac{X_2^T Y}{U V^T Y + W Y^T Y}$$

$$Y \leftarrow Y \odot \frac{X_2^T W}{V U^T W + Y W^T W}.$$

That is, the NMPCF analysis unit 130 may initialize U, Z, V, W, and Y to be non-negative real numbers in accordance with the NMPCF algorithm, and repeatedly update U, Z, V, W, and Y until approaching a predetermined value based on Equation 3.

In this instance, a multiplicative characteristic of Equation 3 may not change signs of elements included in the entity matrices.

The target instrument signal separating unit 140 may separate, from the mixed signal, a target instrument signal corresponding to the predetermined sound source signal by calculating an inner product between the entity matrices obtained by the NMPCF analysis unit 130. In this instance, the target instrument signal may be a signal including the sounds performed using the predetermined musical instrument from among the mixed signal $X_2$.

Specifically, the target instrument signal separating unit 140 may separate the target instrument signal included in the mixed signal $X_2$ by calculating an inner product between U and V, and convert the separated target instrument signal into an approximation signal $UV^T$ expressed in a magnitude unit of a time-frequency domain.

The time domain signal conversion unit 150 may convert the target instrument signal into a signal of the time domain using the phase information $\Phi_2$ extracted by the time-frequency domain conversion unit 120.

Specifically, the time domain signal conversion unit 150 may convert $UV^T$ into the time-domain signal using the phase information $\Phi_2$ to thereby obtain an approximation signal s of the target instrument signal.

Figure 2:
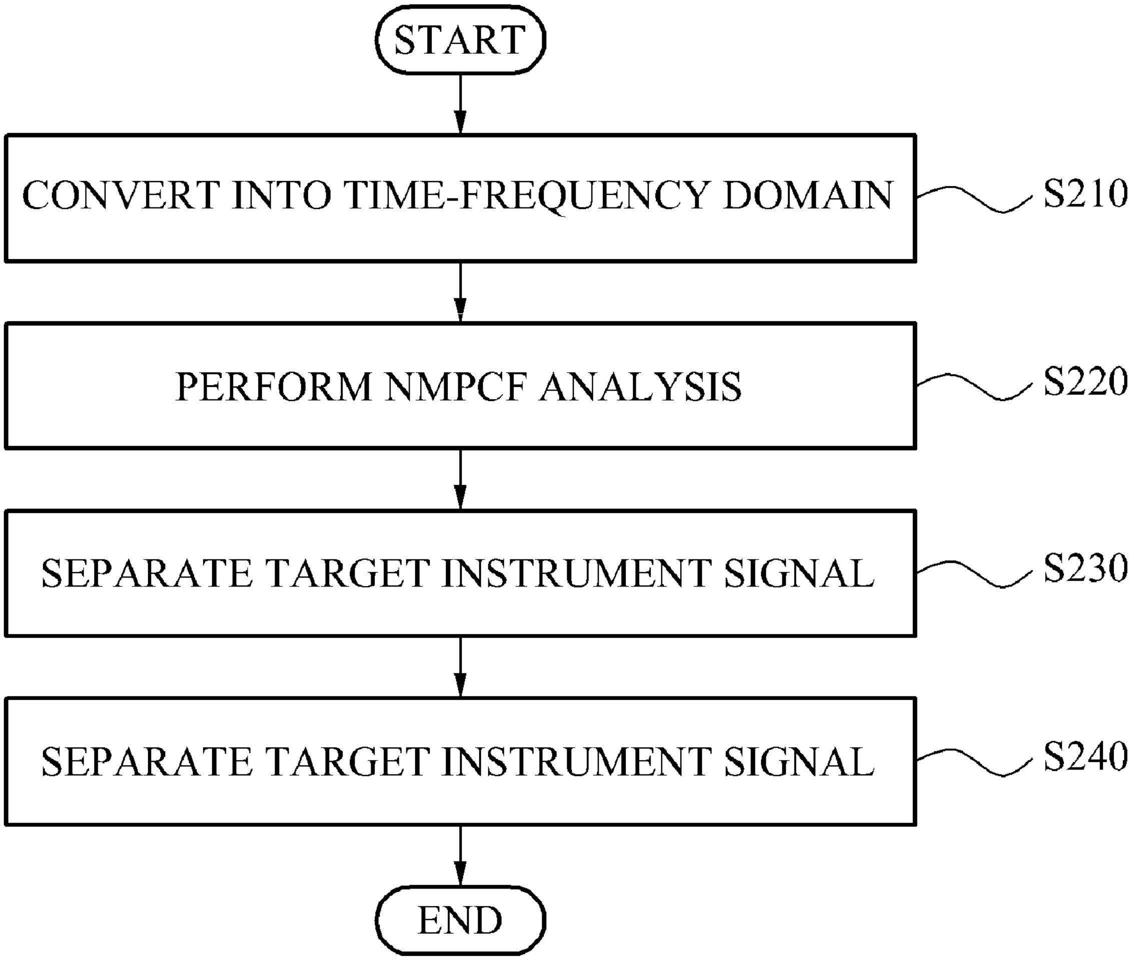
FIG. 2 is a flowchart illustrating a method of separating a musical sound source according to an embodiment of the present invention.

FIG. 2 is a flowchart illustrating a method of separating a musical sound source according to an embodiment of the present invention.

In operation S210, the time-frequency domain conversion unit 120 may receive a mixed signal and predetermined sound source signal of a time domain, and convert the received mixed signal and predetermined sound source signal of the time domain into a mixed signal and predetermined sound source signal of a time-frequency domain to thereby extract phase information from the received mixed signal of the time domain.

In operation S220, the NMPCF analysis unit 130 may perform, using a sound source separation model, an NMPCF analysis on the mixed signal and predetermined sound source signal converted in operation S210 to thereby obtain entity matrices.

Specifically, the NMPCF analysis unit 130 may obtain, based on Equation 1, a frequency domain characteristic matrix U of the predetermined sound source signal, a location and intensity matrix Z in which U is expressed in a time domain of the predetermined sound source signal, a location and intensity matrix V in which U is expressed in a time domain of the mixed signal, a frequency domain characteristic matrix W of remaining sound sources included in the mixed signal, and a location and intensity matrix Y in which W is expressed in the time domain of the mixed signal, and update U, Z, V, W, and Y based on Equation 3.

In operation S230, the target instrument signal separating unit 140 may separate, from the mixed signal, a target instrument signal corresponding to the predetermined sound source signal by calculating an inner product between the entity matrices obtained in operation S220.

In operation S240, the time domain signal conversion unit 150 may convert, using the phase information extracted in operation S210, the target instrument signal separated in operation S230 into a signal of a time domain to thereby obtain an approximation signal of the target instrument signal.

Figure 3:
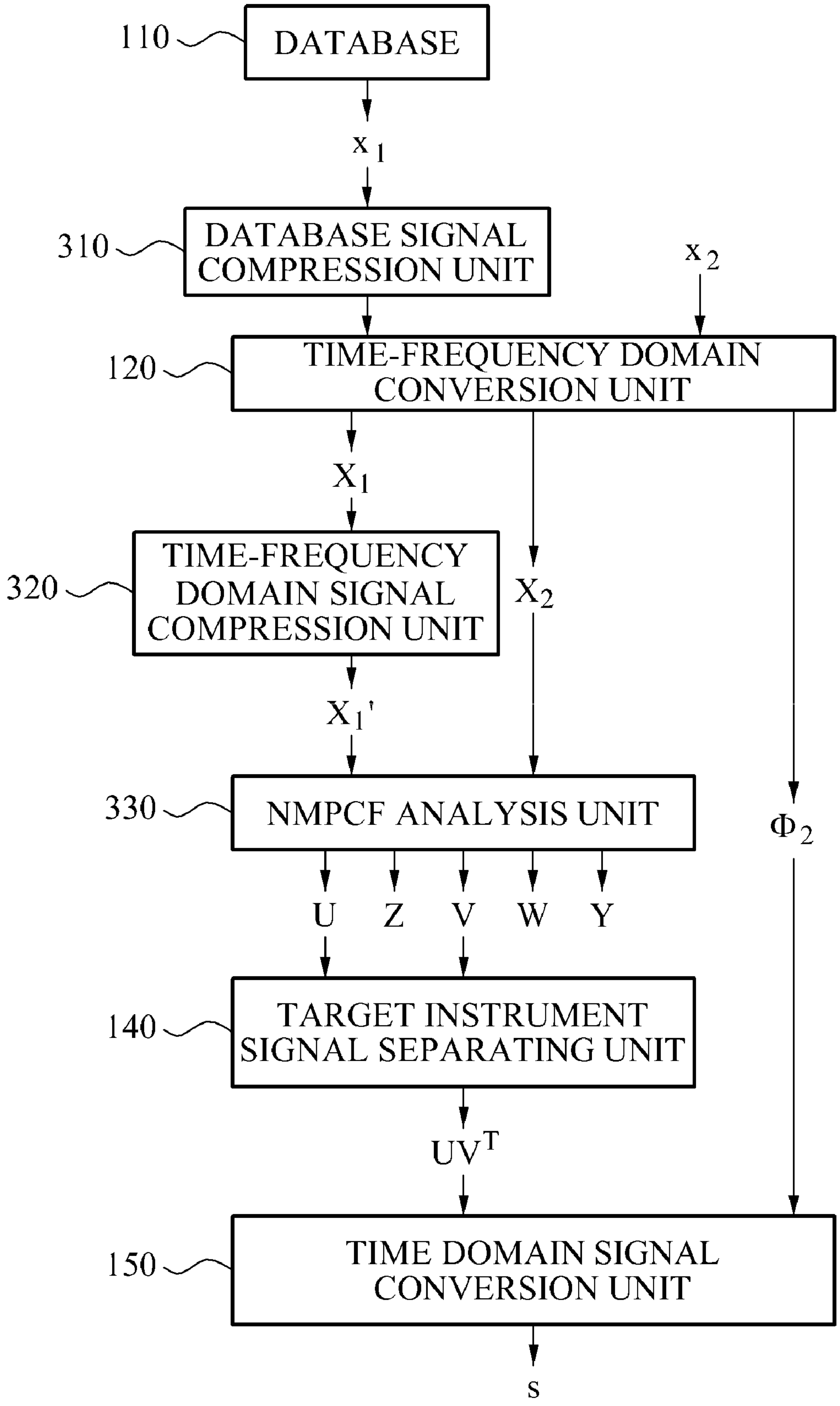
FIG. 3 illustrates an example of an apparatus of separating a musical sound source according to another embodiment of the present invention.

FIG. 3 illustrates an example of an apparatus of separating a musical sound source according to another embodiment of the present invention.

The apparatus according to the other embodiment may be used to overcome complexity in calculation and difficulties in an aspect of utilization of a memory, which are generated when the NMPCF analysis unit 130 receives a large amount of single sound source information as the sound source signal $X_1$ of the time-frequency domain, and may be an example of reducing an amount of data while maintaining characteristics of database storing information about a solo performance using a predetermined musical instrument.

The apparatus according to the other embodiment includes, as illustrated in FIG. 3, a database 110, a database signal compression unit 310, a time-frequency domain conversion unit 120, a time-frequency domain signal compression unit 320, an NMPCF analysis unit 330, a target instrument signal separating unit 140, and a time domain signal conversion unit 150. The apparatus may compress a predetermined sound source signal, and perform an NMPCF analysis on the compressed predetermined sound source signal.

In this instance, the database 110, the time-frequency domain conversion unit 120, the target instrument signal separating unit 140, and the time domain signal conversion unit 150 may have the same configurations as those of FIG. 1 and thus, further descriptions thereof will be omitted.

The database signal compression unit 310 may compress a predetermined sound source signal of a time domain transmitted from the database 110.

For example, the database signal compression unit 310 may extract only sounds performed by percussion instruments from predetermined sound source signals of a time domain including only signals of the percussion instruments while disregarding remaining sounds other than the percussion sounds, thereby extracting only relevant parts of the database.

The time-frequency domain signal compression unit 320 may compress the predetermined sound source signal that is converted into the time-frequency domain in the time-frequency domain conversion unit 120.

For example, the time-frequency domain signal compression unit 320 may perform a Nonnegative Matrix Factorization (NMF) analysis on the predetermined sound source signal of the time-frequency domain, and thereby a database signal of a time-frequency domain may be expressed as a product of a base vector matrix $X_1'$ and a weight matrix. Also, the time-frequency domain signal compression unit 320 may transmit, to the NMPCF analysis unit, only the base vector matrix $X_1'$ as the compressed database signal.

Also, the database signal compression unit 310 and the time-frequency domain signal compression unit 320 may be complementarily operated.

The NMPCF analysis unit 320 may perform an NMPCF analysis on the mixed signal and the base vector matrix using the sound source separation model to thereby obtain a plurality of entity matrices based on the analysis result.

Specifically, the NMPCF analysis unit 320 may obtain U, Z, V, W, and Y using the base vector matrix $X_1'$ extracted by the time-frequency domain signal compression unit 320 instead of the sound source signal $X_1$.

Figure 4:
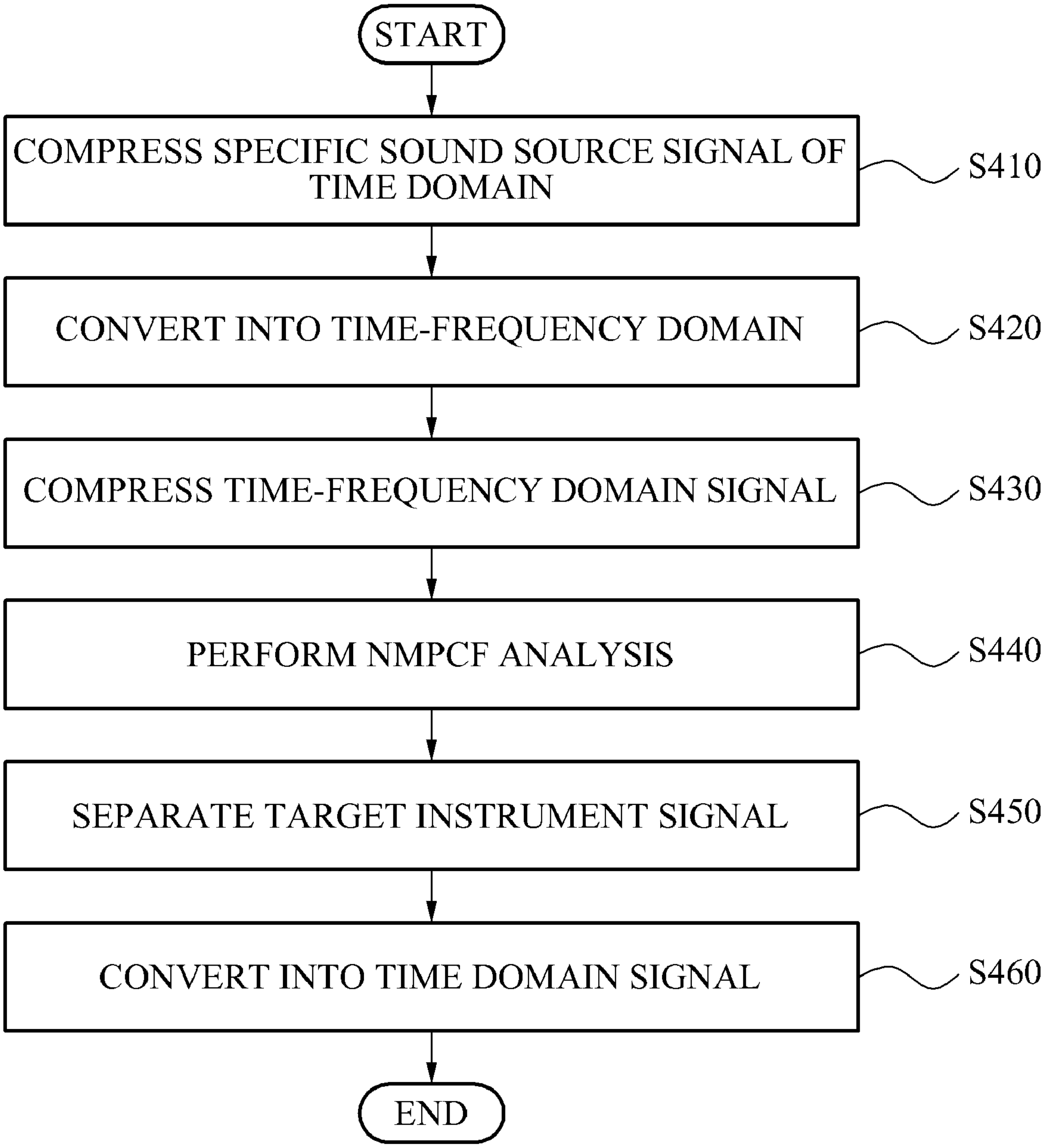
FIG. 4 is a flowchart illustrating a method of separating a musical sound source according to another embodiment of the present invention.

FIG. 4 is a flowchart illustrating a method of separating a musical sound source according to another embodiment of the present invention.

In operation S410, the database signal compression unit 310 may compress a predetermined sound source signal of a time domain transmitted from the database 110 to thereby transmit the compressed signal to the time-frequency domain conversion unit 120.

In operation S420, the time-frequency domain conversion unit 120 may receive a mixed signal of a time domain and the predetermined sound source signal compressed in operation S410, convert the received predetermined sound source signal and mixed signal into a mixed signal and predetermined sound source signal of a time-frequency domain, and extract phase information from the received mixed signal and predetermined sound source signal of the time domain.

In operation S430, the time-frequency domain signal compression unit 320 may perform an NMF analysis on the predetermined sound source signal of the time-frequency domain converted in operation S420 to thereby extract a base vector matrix.

In operation S440, the NMPCF analysis unit 320 may perform an NMPCF analysis on the mixed signal converted in operation S420 and the base vector matrix extracted in operation S430 to thereby obtain entity matrices.

Specifically, the NMPCF analysis unit 320 may obtain, based on Equation 1, a frequency domain characteristic matrix U of the predetermined sound source signal, a location and intensity matrix Z in which U is expressed in a time domain of the predetermined sound source signal, a location and intensity matrix V in which U is expressed in a time domain of the mixed signal, a frequency domain characteristic matrix W of remaining sound sources included in the mixed signal, and a location and intensity matrix Y in which W is expressed in the time domain of the mixed signal, and update U, Z, V, W, and Y based on Equation 3.

In operation S450, the target instrument signal separating unit 140 may separate a target instrument signal corresponding to the predetermined sound source signal from the mixed signal by calculating an inner product between the entity matrices obtained in operation S440.

In operation S460, the time domain signal conversion unit may convert, using the phase information extracted in operation S420, the target instrument signal separated in operation S450 into a signal of a time domain to thereby obtain an approximation signal of the target instrument signal.

As described above, according to embodiments of the present invention, there is provided an apparatus of separating a musical sound source, which may re-construct mixed signals into target sound sources and other sound sources directly using sound source information performed using a predetermined musical instrument when the sound source information is present, thereby more effectively separating sound sources included in the mixed signal.

Also, according to embodiments of the present invention, there is provided an apparatus of separating a musical sound source which may separate a desired sound source from a single mixed signal and thus, may be applicable in separating commercial musical sounds obtaining only one or two mixed signals.

Also, there is no need for entire processes of inputting a separator for separately extracting characteristics of the target sound source signal and characteristics of the segmented mixed signal, and there is no need for learning the separator.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus of separating musical sound sources, the apparatus comprising:

a Nonnegative Matrix Partial Co-Factorization (NMPCF) analysis unit to perform an NMPCF analysis on a mixed signal and a predetermined sound source signal using a sound source separation model, and to obtain a plurality of entity matrices based on the analysis result; and a target instrument signal separating unit to separate, from the mixed signal, a target instrument signal corresponding to the predetermined sound source signal by calculating an inner product between the plurality of entity matrices.

2. The apparatus of claim 1, wherein the predetermined sound source signal is a signal including information about a solo performance using a predetermined musical instrument, the mixed signal is a musical signal where performances of various musical instruments or voices are mixed, and the target instrument signal is a signal including sounds performed using the predetermined musical instrument from among the mixed signal.

3. The apparatus of claim 2, wherein the plurality of entity matrices obtained by the NMPCF analysis unit includes a frequency domain characteristic matrix U of the predetermined sound source signal, a location and intensity matrix Z in which U is expressed in a time domain of the predetermined sound source signal, a location and intensity matrix V in which U is expressed in a time domain of the mixed signal, a frequency domain characteristic matrix W of remaining sound sources included in the mixed signal, and a location and intensity matrix Y in which W is expressed in the time domain of the mixed signal.

4. The apparatus of claim 3, wherein the target instrument signal separating unit calculates an inner product between U and V to separate the target instrument signal included in the mixed signal, and converts the separated target instrument signal into an approximation signal expressed in a magnitude unit of a time-frequency domain.

5. The apparatus of claim 3, wherein the NMPCF analysis unit determines the predetermined sound source signal as a product of U and Z, and determines the mixed signal as a product of ½ of U and V summed with a product of ½ a weight of W and Y to thereby obtain the plurality of entity matrices U, Z, V, W, and Y.

6. The apparatus of claim 3, wherein the NMPCF analysis unit initializes the plurality of entity matrices to be a non-negative real number.

7. The apparatus of claim 6, wherein the NMPCF analysis unit updates values of the plurality of entity matrices using the plurality of entity matrices, the mixed signal, and the predetermined sound source signals.

8. The apparatus of claim 2, further comprising:

a time-frequency domain conversion unit to receive the mixed signal and the predetermined sound source signal of a time domain, to convert the received mixed signal and predetermined sound source signal of the time domain into the mixed signal and the predetermined sound source signal of a time-frequency domain to transmit the converted signals to the NMPCF analysis unit, and to extract phase information from the received mixed signal and predetermined sound source signal of the time domain; and a time domain signal conversion unit to convert the target instrument signal into a time domain signal using the phase information, and to separate, from the mixed signal, the sounds performed using the predetermined musical instrument.

9. An apparatus of separating musical sound sources, the apparatus comprising:

a time-frequency domain signal compression unit to perform a Nonnegative Matrix Factorization (NMF) analysis on a predetermined sound source signal to extract a base vector matrix;

an NMPCF analysis unit to perform an NMPCF analysis on a mixed signal and the base vector matrix using a sound source separation model, and to obtain a plurality of entity matrices based on the analysis result; and a target instrument signal separation unit to separate, from the mixed signal, a target instrument signal corresponding to the predetermined sound source signal by calculating an inner product between the plurality of entity matrices.

10. The apparatus of claim 9, further comprising:

a database signal compression unit to compress the predetermined sound source signal of a time domain to transmit the compressed signal to the time-frequency domain conversion unit;

a time-frequency domain conversion unit to receive the mixed signal and the compressed predetermined sound source signal of the time domain, to convert the received mixed signal and compressed predetermined sound source signal of the time domain into the mixed signal and the predetermined sound source signal of a time-frequency domain to transmit the converted signals to the NMPCF analysis unit, and to extract phase information from the received mixed signal and compressed predetermined sound source signal of the time domain; and a time domain signal conversion unit to convert the target instrument signal into a time domain signal using the phase information, and to separate, from the mixed signal, sounds performed using the predetermined musical instrument.

11. A method of separating musical sound sources, the method comprising:

converting a mixed signal and a predetermined sound source signal of a time domain into a mixed signal and a predetermined sound source signal of a time-frequency domain;

extracting phase information from the mixed signal and the predetermined sound source signal of the time domain;

performing an NMPCF analysis on the mixed signal and the predetermined sound source signal of the time-frequency domain using a sound source separation model;

obtaining a plurality of entity matrices based on the NMPCF analysis result;

separating, from the mixed signal, a target instrument signal corresponding to the predetermined sound source signal by calculating an inner product between the plurality of entity matrices; and separating, from the mixed signal, sounds performed using a predetermined musical instrument by converting the target instrument signal into a time-domain signal using the phase information.

12. The method of claim 11, wherein the predetermined sound source signal is a signal including information about a solo performance using the predetermined musical instrument, the mixed signal is a musical signal where performances of various musical instruments or voices are mixed, and the target instrument signal is a signal including sounds performed using the predetermined musical instrument from among the mixed signal.

13. The method of claim 12, wherein the obtained plurality of entity matrices includes a frequency domain characteristic matrix U of the predetermined sound source signal, a location and intensity matrix Z in which U is expressed in a time domain of the predetermined sound source signal, a location and intensity matrix V in which U is expressed in a time domain of the mixed signal, a frequency domain characteristic matrix W of remaining sound sources included in the mixed signal, and a location and intensity matrix Y in which W is expressed in the time domain of the mixed signal.

14. The method of claim 13, wherein the separating of the target instrument signal comprises:

separating the target instrument signal included in the mixed signal by calculating an inner product between U and V; and converting the target instrument signal into an approximation signal expressed in a magnitude unit of the time-frequency domain.

15. The method of claim 13, wherein the obtaining of the plurality of entity matrices determines the predetermined sound source signal as a product of U and Z, and determines the mixed signal as a product of ½ of U and V summed with a product of ½ a weight of W and Y to thereby obtain the plurality of entity matrices U, Z, V, W, and Y.

16. A method of separating musical sound sources, the method comprising:

converting a mixed signal and a predetermined sound source signal of a time domain into a mixed signal and a predetermined sound source signal of a time-frequency domain;

extracting phase information from the mixed signal and the predetermined sound source of the time domain;

performing an NMF analysis on the predetermined sound source signal of the time-frequency domain to extract a base vector matrix;

performing an NMPCF analysis on the mixed signal and the base vector matrix using a sound source separation model;

obtaining a plurality of entity matrices based on the NMPCF analysis result;

separating, from the mixed signal, a target instrument signal corresponding to the predetermined sound source signal by calculating an inner product between the plurality of entity matrices; and separating, from the mixed signal, sounds performed using a predetermined musical instrument by converting the target instrument signal into a time domain signal using the phase information.

17. The method of claim 16, further comprising:

compressing the predetermined sound source signal of the time domain, wherein the converting converts the compressed predetermined sound source signal into the mixed signal of the time-frequency domain.

* * * * *